United States Patent
White et al.

(10) Patent No.: US 9,444,946 B2
(45) Date of Patent: *Sep. 13, 2016

(54) ENHANCED CALLER ID WITH RECIPIENT-SELECTED CALLER INFORMATION DISPLAY

(75) Inventors: Scott White, Austin, TX (US); James Cansler, Jr., Pflugerville, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 461 days.

This patent is subject to a terminal disclaimer.

(21) Appl. No.: 13/306,667

(22) Filed: Nov. 29, 2011

(65) Prior Publication Data

US 2012/0076285 A1    Mar. 29, 2012

Related U.S. Application Data

(63) Continuation of application No. 11/186,622, filed on Jul. 21, 2005, now Pat. No. 8,160,222.

(51) Int. Cl.
| | |
|---|---|
| *H04M 1/56* | (2006.01) |
| *H04M 15/06* | (2006.01) |
| *H04N 21/441* | (2011.01) |
| *H04N 21/442* | (2011.01) |

(52) U.S. Cl.
CPC .......... *H04M 15/06* (2013.01); *H04N 21/441* (2013.01); *H04N 21/44222* (2013.01)

(58) Field of Classification Search
USPC .......... 379/142.17, 142.14, 142.06, 142.01, 379/142.04, 142.07, 142.09, 29.09, 88.11, 379/121.04, 201.04
See application file for complete search history.

(56) References Cited

U.S. PATENT DOCUMENTS

| | | | |
|---|---|---|---|
| 5,546,447 A | 8/1996 | Skarbo et al. | |
| 5,907,604 A * | 5/1999 | Hsu .................. | H04M 1/576 348/14.01 |

(Continued)

FOREIGN PATENT DOCUMENTS

GB    2305329 A    4/1997

OTHER PUBLICATIONS

Office Action for Canadian Patent Application No. 2,615,818 received from the Canadian Intellectual Property Office (CIPO) dated Nov. 25, 2009, 2 pages.

(Continued)

*Primary Examiner* — Yosef K Laekemariam
(74) *Attorney, Agent, or Firm* — Toler Law Group, PC (57) ABSTRACT

A method includes receiving an incoming call at a first device. The method includes determining whether second caller identification information is available at the first device based on first caller identification information received with the incoming call. The method further includes retrieving the second caller identification information in response to determining that the second caller identification information is available at the first device. The method further includes presenting a graphical display at a display device. The graphical display includes a plurality of caller information fields. The plurality of caller information fields are populated based on the first caller identification information and based on the second caller identification information. The graphical display also includes a user selectable edit option to edit the second caller identification information during the incoming call. The method further includes modifying the second caller identification information in response to selection of the user selectable edit option.

20 Claims, 5 Drawing Sheets

(56) References Cited

U.S. PATENT DOCUMENTS

| | | | |
|---|---|---|---|
| 6,061,434 A | 5/2000 | Corbett | |
| 7,068,768 B2 | 6/2006 | Barnes | |
| 7,565,680 B1 | 7/2009 | Asmussen | |
| 7,660,404 B2 | 2/2010 | Min et al. | |
| 2003/0012353 A1 | 1/2003 | Tang et al. | |
| 2003/0063732 A1* | 4/2003 | Mcknight | H04M 1/274575 379/210.01 |
| 2004/0203835 A1* | 10/2004 | Trottier | H04M 1/576 455/454 |
| 2004/0261115 A1 | 12/2004 | Bartfeld | |
| 2007/0036313 A1 | 2/2007 | White et al. | |
| 2007/0275708 A1* | 11/2007 | Henderson | H04M 1/2745 455/415 |

OTHER PUBLICATIONS

International Search Report and Written Opinion of the International Searching Authority for International Application No. PCT/US2006/028237, Mailed on Mar. 23, 2007, 14 pages.

SonyEricsson, "P900 Bedienungsanleitung," Aug. 2003, retrieved from the Internet: http://www.t-mobile.de/downloads/bedie/nungsanleitungen/bedienung_p900_de.pdf. 108 pages.

Disposition of the Oral Proceedings for European Application No. 06788016.1-2414 received from the European Patent Office (EPO) dated Mar. 4, 2010, 21 pages.

Summons to Attend Oral Proceedings for European Application No. 06788016.1-2414 received from the European Patent Office (EPO) dated Jul. 28, 2009, 6 pages.

\* cited by examiner

ENHANCED CALLER ID WITH RECIPIENT-SELECTED CALLER INFORMATION DISPLAY

CLAIM OF PRIORITY

The present application claims priority from and is a continuation of U.S. patent application Ser. No. 11/186,622, filed on Jul. 21, 2005 and entitled "ENHANCED CALLER ID WITH RECIPIENT-SELECTED CALLER INFORMATION DISPLAY," the contents of which are expressly incorporated herein by reference in their entirety.

FIELD OF THE DISCLOSURE

The present disclosure relates to telecommunications, and in particular to systems, methods and media for enhanced caller ID information.

BACKGROUND

Some Digital Video Recorders (DVRs, also known as Personal Video Recorders or PVRs), Satellite/Cable Receivers and other types of television Set-Top Boxes (STBs) include Caller ID Display functionality, where the phone number and name associated with an incoming phone call is displayed on the television screen.

DETAILED DESCRIPTION

The present disclosure, through one or more of its various aspects, embodiments and/or specific features or sub-components, is intended to bring out one or more of the advantages that will be evident from the description. The present disclosure is described with frequent reference to television set-top boxes. It is understood, however, that a set-top box is merely an example of a specific embodiment of the present disclosure, which is directed broadly to networked interactive television within the scope of the disclosure. The terminology, examples, drawings and embodiments, therefore, are not intended to limit the scope of the disclosure.

Some DVRs, Satellite/Cable Receivers and other types of STBs include Caller ID Display functionality that allow the phone number and name associated with an incoming phone call to display on the television screen. The next generation of STBs, however, will include storage and access capabilities for media beyond standard television content. Storage and access features may also be available with game consoles connected to the television, particularly those consoles that provide online, multiplayer, capabilities over a network. In fact, the term STB is considered, for the purposes of this disclosure, to include such consoles.

The media includes storage of and access to a user's digital photo collection and address book. The storage may be local, i.e., stored on the STB's hard drive, or remote, i.e., stored on a network resource such as a server.

The present disclosure provides solutions for linking Caller ID Display functionality with Photo and/or Address Book or other database information elements, resulting in a richer STB Caller ID Display experience. An advantage of the present disclosure is that the call recipient selects the information to associate with the caller. This is advantageous because it is the recipient that is in the best position to know which information, including which image or images, is most useful to the recipient in relation to the caller.

For instance, were the caller to select an image of him or herself for caller ID display, he or she might select an outdated, unrecognizable, image that does not, in fact, inform the recipient of who is calling. The recipient may not even be able to discern the gender or age of the caller. When, however, the recipient is able to select an image, for example, even household children who cannot read caller ID information in a text display would be able to recognize the caller because the image would be an image that the child is most likely familiar with, since the image was selected by the family rather than by the caller.

Additionally, caller selected images may be inappropriate for viewing by all household members of the recipient, yet the recipient is unable to prescreen the image before it is displayed. This may be a particular problem when the caller ID image is displayed on the family television screen during family television viewing. The present disclosure provides a solution to these and other problems of enhanced caller ID, including an easy to use interface that allows the recipient to control what is displayed on their television screen.

Figure 1:
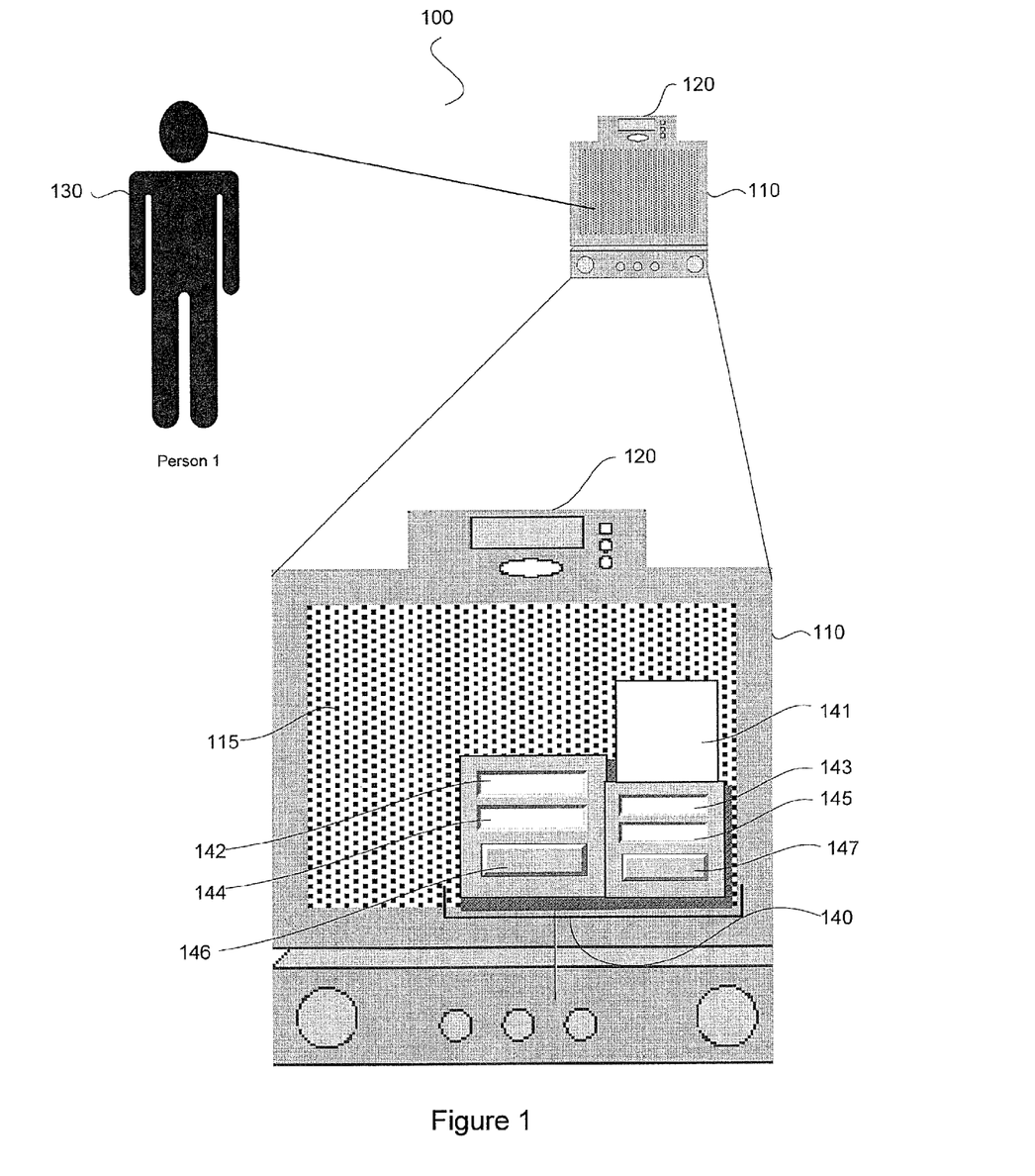
FIG. 1 is a schematic drawing of a specific exemplary embodiment of an enhanced caller ID solution of the present disclosure.

FIG. 1 is a schematic drawing of a specific exemplary embodiment of an enhanced caller ID solution of the present disclosure. Television 110 is connected to set-top box or other device 120 which in turn is connected to a telecommunications network (not shown). Person 130 is watching television 110 when an incoming phone call arrives. STB 120 alerts person 130 of the incoming call and displays caller ID information 140 on television screen 115. Basic caller ID information may be displayed from the standard caller ID service to which person 130 subscribes through his or her telephone service provider.

Display 140 includes photo display inset 141, caller ID text information boxes 142, 143, 144, and 145. Boxes 142 through 145 include, for example, caller first name (142) caller last name (143), caller phone number (144) and additional information (145) such as caller email address. Edit function buttons 146 and 147 are also displayed and are managed using the set-top box remote (not shown) or manually using manual function control buttons (not shown) provided on the set-top box housing.

Any customized caller ID information (beyond basic information provided by the service provider) is obtained from the set-top box, or other device, storage media using the caller ID information from the service provider to map information pre-selected by person 130 and associated with the caller to display in enhanced display 140.

In the event that person 130 has not pre-selected information associated with the caller, person 130 may use edit functions accessed by button 146 to pull up a menu on screen 115 that allows person 130 to navigate through one or more databases accessible by storage media device 120, such as a set-top box or game console, to add select information about the caller to the various fields 142-145 of display 140. Of course, it is understood that fields 142-145 are purely illustrative in content and number, and that embodiments of the present disclosure provide more or fewer information fields, and the amount of information contained in each field, to which person 130 may add as much or as little information about the caller as desired. Certain embodiments provide for person 130 to add or delete fields, or change the amount of information in each field, as desired within the resolution and space constraints of screen 115. Button 147 provides, for example, a cancel function to clear the caller ID display from the display screen.

Additionally, television 110 continues to display the programming being viewed prior to the incoming call by virtue of picture-in-picture capability, or other analogous technology, supported by STB 120 or television 110 for uninterrupted viewing during the phone call.

Figure 2:
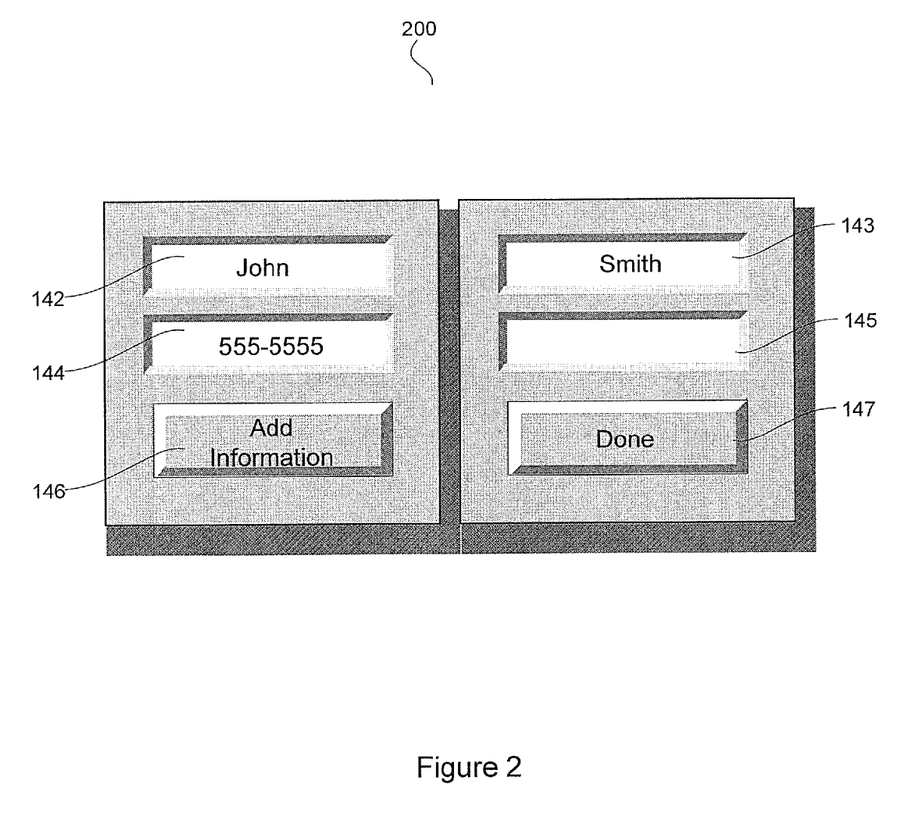
FIG. 2 is a schematic drawing of a detail of a caller ID display of FIG. 1.

FIG. 2 is a schematic drawing of a detail of a caller ID display of FIG. 1. Display 140 provides text information fields that show, for example, the caller's first name 142, last name 143, telephone number 144, and additional information 145, such as the name of the caller's spouse. Optionally selectable Edit button 146 provides edit capability to edit the information, including but not limited to an image, to be displayed. Button 146 opens a menu (not shown) to access additional information to include in display 140. Save functions (not shown) allow the call recipient to save edited information in storage media device 120 after editing the information and the menu is closed. Optionally selectable Cancel button 147 clears display 140 from the TV screen.

Figure 3:
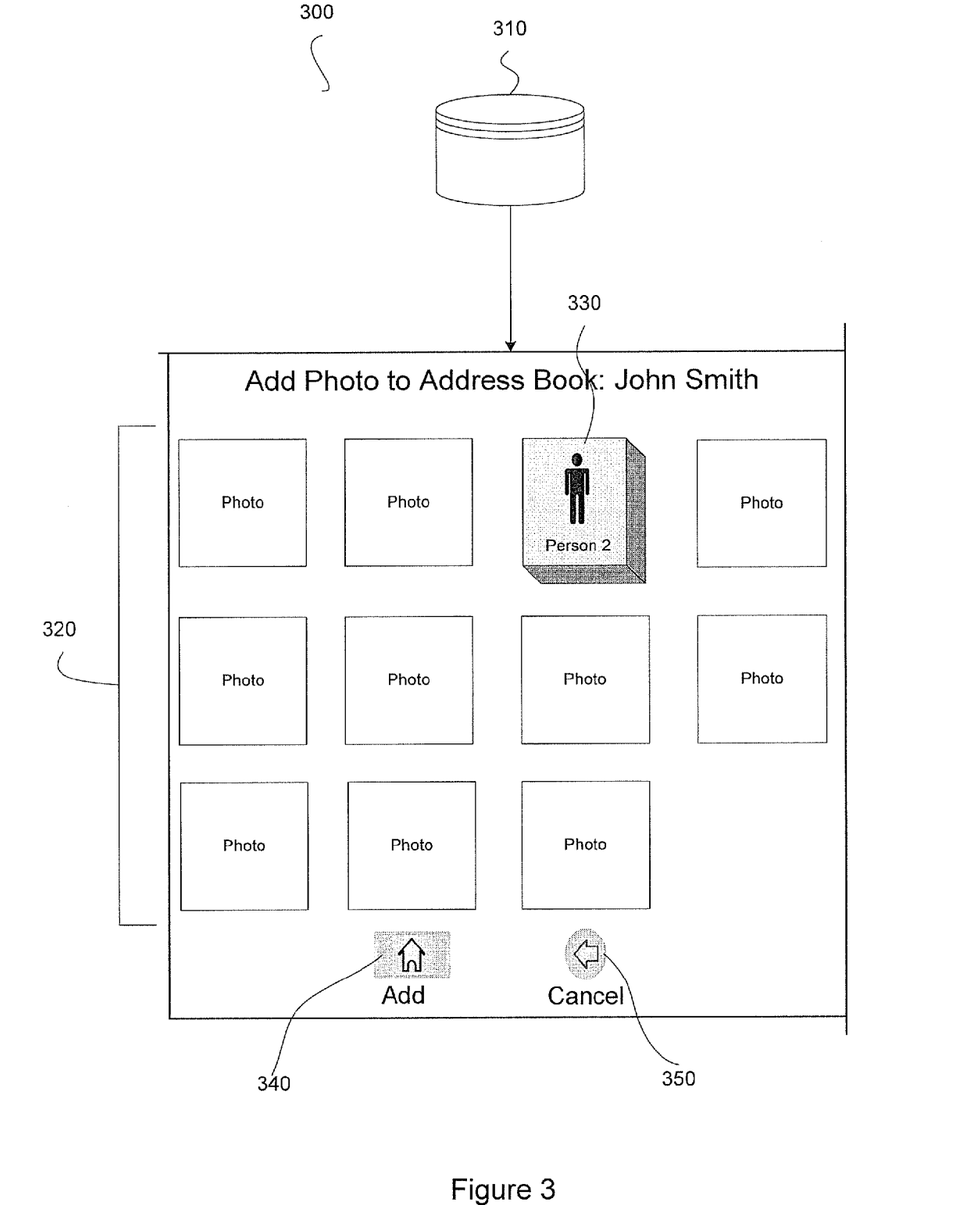
FIG. 3 is a schematic drawing of an exemplary image database for selecting an image for display in an exemplary embodiment of an enhanced Caller ID system of the present disclosure.

FIG. 3 is a schematic drawing of an exemplary image database for selecting an image for display in an exemplary embodiment of an enhanced Caller ID system of the present disclosure. Database 130 provides a variety of images 320 that a user can select for display. Images 320 may be provided from a variety of sources, such as an electronic address book, a digital camera, a camera phone, a hard drive, a floppy disk or CD-ROM or other electronic storage medium, a PDA (including BlackBerry™-type devices), an email attachment, a network server, an online source, the world wide web, or any source for an electronic image within the constraints of space and resolution of the disclosure.

Database 310 is accessed by activating optionally selectable Edit button 146 from display 140 and navigating through the accessible databases to bring up an image database. An image 330 is selected by a user and added to display 140 in field 141 by activating Add button 340. Database display 310 is closed by activating Cancel button 350 to exit without editing or without saving any edit.

Figure 4:
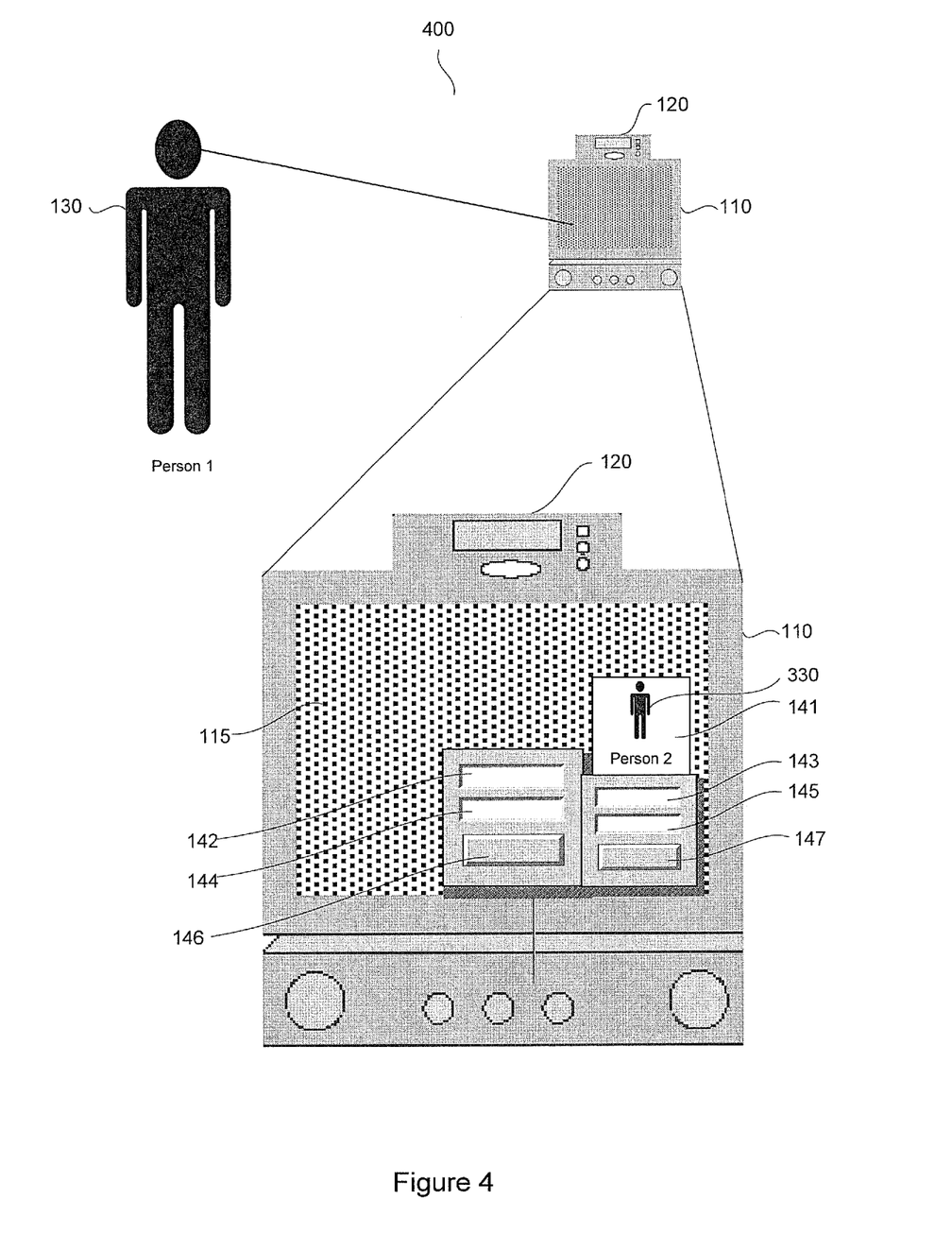
FIG. 4 is a schematic drawing of a specific exemplary embodiment of an enhanced caller ID solution of FIG. 1 showing a call recipient-selected image associated with the caller in a display field of the disclosure.

FIG. 4 is a schematic drawing of a specific exemplary embodiment of an enhanced caller ID solution of FIG. 1 showing a call recipient-selected image associated with the caller in a display field of the disclosure. Display field 141 contains image 330, which was either pre-selected by the call recipient or was selected using the edit function of display 140 when display 140 was presented in connection with an incoming call from the caller.

In addition to image or photo display, the present disclosure further provides embodiments that allow the user to display a wide variety of personal information about the caller. Edit function 146 provides access to any data accessible through an electronic database and allows the call recipient to associate such data with the caller's Caller ID for display on a caller ID display screen. Caller personal information, for the purposes of this disclosure includes, but is not limited to, the name of the caller's spouse, the genders and names of the caller's children, the caller's email address, the caller's business contact information, the caller's residential or business address, the species and names of the caller's pets, the caller's website URL, the caller's relationship to the call recipient (such as familial relationship, if any), and the caller's gender and marital status.

In addition to television screen display, the present disclosure contemplates enhanced caller ID display on a display screen of a communications terminal such as a cell phone, a Personal Digital Assistant (PDA) including BlackBerry®-type devices, a personal computer, a Voice over Internet Protocol (VoIP) terminal, an Internet Protocol Television (IPTV), and so forth.

Figure 5:
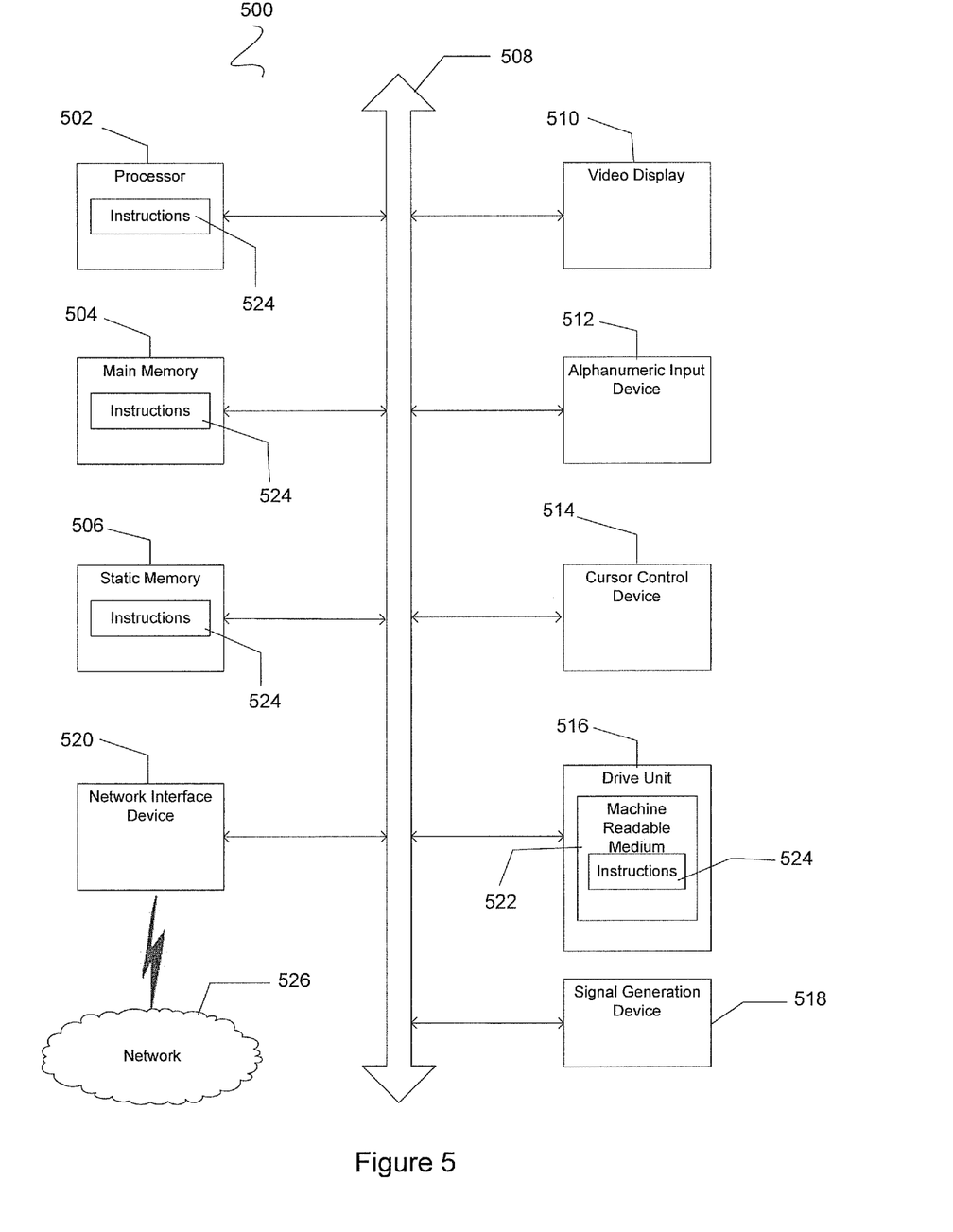
FIG. 5 is a diagrammatic representation of a machine in the form of a computer system within which a set of instructions, when executed, may cause the machine to perform any one or more of the methodologies of the present disclosure.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 622 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524 so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In accordance with various embodiments of the present disclosure, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. The disclosure is considered to include a tangible storage medium as listed herein and including art-recognized equivalents and successor media, in which the software implementations herein are stored.

Accordingly, those skilled in the art will recognize that the present disclosure extends to machine-readable media ("MRM") contain instructions for execution by a programmable machine such as a computer. MRM is broadly defined to include any kind of computer memory such as floppy disks, conventional hard disks, CD-ROMs, Flash ROMS, nonvolatile ROM, RAM, Storage Media, solid state media, and magnetic media, together with processors to execute the instructions.

The disclosure has been described with reference to several exemplary embodiments. It is understood, however, that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A computer-readable device storing instructions that, when executed by a processor, cause the processor to perform operations comprising:
   receiving an incoming call at a first device, the incoming call associated with incoming caller identification information associated with a second device;
   determining, based on the incoming caller identification information, whether supplemental information associated with the second device is available from a memory of the first device, wherein the supplemental information includes first information not included in the incoming caller identification information and an image, and wherein the image is selected from an email attachment stored at a third device; and
   in response to determining that the supplemental information is available, presenting a graphical display at a display device in response to the incoming call, the graphical display including:
      a plurality of caller information fields, wherein the plurality of caller information fields are populated based on the incoming caller identification information and based on the first information not included in the incoming caller identification information; and
      a display inset for the image.

2. The computer-readable device of claim 1, wherein the graphical display includes a user selectable edit option to edit the first information.

3. The computer-readable device of claim 2, further comprising, in response to a first selection of the user selectable edit option, modifying the first information.

4. The computer-readable device of claim 3, wherein modifying the first information comprises:
   receiving a second selection of a user-defined set of caller information fields from the plurality of caller information fields; and
   updating the graphical display to present the user-defined set of caller information fields.

5. The computer-readable device of claim 2, further comprising, in response to a first selection of the user selectable edit option, displaying a menu that enables access to particular information available for use as the first information.

6. The computer-readable device of claim 1, wherein the first device is a media device and the display device is a television screen, and wherein the graphical display is presented at a first window at the television screen without interrupting presentation of content displayed at the television screen when the incoming call is received.

7. The computer-readable device of claim 1, wherein the first device is a communication device and the display device is a display screen of the communication device.

8. The computer-readable device of claim 1, wherein the first device is a communications device.

9. The computer-readable device of claim 1, wherein the third device is one of a media playback device, a wireless communication device, a personal digital assistant, a personal computer, a voice over internet protocol terminal, a game console, an electronic address book, a digital camera, a data storage device, a network server, and a television device.

10. The computer-readable device of claim 1, wherein the graphical display further includes a cancel button to remove caller information.

11. The computer-readable device of claim 1, wherein the supplemental information includes a name of a spouse associated with a particular person identified by the caller identification information, a name of a child of the particular person, a birthday of the particular person, a birthday of the spouse, a birthday of the child, a business address of the particular person, an email address of the particular person, a residential address of the particular person, a name of a pet of the particular person, a species of the pet, a website associated with the particular person, a relationship between a person associated with the first device and the particular person, a gender of the particular person, a marital status of the particular person, or any combination thereof.

12. The computer-readable device of claim 1, wherein determining whether the supplemental information is available includes mapping first data included in the incoming caller identification information to second data included in the supplemental information.

13. The computer-readable device of claim 1, wherein the graphical display includes a user selectable edit option, and wherein the user selectable edit option enables a recipient of the incoming call to configure the graphical display to display a first portion of information associated with a particular caller information field of the plurality of caller information fields and to not display a second portion of the information associated with the particular caller information field.

14. A method comprising:
   receiving an incoming call at a first device, the incoming call associated with incoming caller identification information associated with a second device;
   determining, based on the incoming caller identification information, whether supplemental information associated with the second device is available at the first device from a memory of the first device, wherein the supplemental information includes first information not included in the incoming caller identification information and an image, and wherein the image is selected from an email attachment stored at a third device; and
   in response to determining that the supplemental information is available, presenting a graphical display at a display device in response to the incoming call, the graphical display including:
      a plurality of caller information fields, wherein the plurality of caller information fields are populated based on the incoming caller identification information and based on the first information not included in the incoming caller identification information; and
      a display inset for the image.

15. The method of claim 14, wherein the graphical display includes a user selectable edit option to edit the first information.

16. The method of claim 15, further comprising, in response to a selection of the user selectable edit option, modifying the first information.

17. The method of claim 14, wherein determining whether the supplemental information is available includes mapping first data included in the incoming caller identification information to second data included in the supplemental information.

18. A media device comprising:
a database of supplemental information in a memory, wherein the supplemental information includes first caller information associated with a calling device not included in caller identification information and an image, wherein the first caller information and the image are designated by a user of the media device as assigned to particular caller identification information, and wherein the image is selected from an email attachment stored at device other than the media device;
a video display output to send, based on incoming caller identification information, the particular caller identification information to a display device coupled to the media device in response to receiving an incoming call; and instructions stored in the memory and executable by a processor to: send a user interface to the display device in response to receiving the incoming call, wherein the user interface displays the image at a display inset and populates a plurality of caller information fields based on the incoming caller identification information received with the incoming call and based on the first caller information not included in the incoming caller identification information, wherein a first field of the caller information fields indicates a marital status of a person associated with the calling device, and wherein a second field of the caller information fields indicates a name of a spouse when the first field indicates a married status.

19. The media device of claim 18, wherein the supplemental information includes a plurality of images associated with a caller, and wherein the image is one of the plurality of images and is designated by the user for display when a call is received from the caller.

20. The media device of claim 19, wherein the user interface includes a user selectable edit option, and further comprising instructions stored in the memory that are executable by the processor to, in response to a first selection of the user selectable edit option:
access a second plurality of images;
receive a second selection of a second image from among the second plurality of images;
associate the second image with the caller; and
store the second image in the database as associated with the incoming caller identification information.

* * * * *